United States Patent [19]
Luckenbach et al.

[11] 3,996,013
[45] Dec. 7, 1976

[54] CATALYTIC HYDROCARBON CONVERSION APPARATUS

[75] Inventors: Edward C. Luckenbach, Mountainside; Arthur C. Worley, Morristown, both of N.J.

[73] Assignee: Exxon Research and Engineering Company, Linden, N.J.

[22] Filed: Feb. 7, 1975

[21] Appl. No.: 547,771

Related U.S. Application Data

[62] Division of Ser. No. 451,804, March 18, 1974, Pat. No. 3,923,642.

[52] U.S. Cl. .............................. 23/288 B; 23/288 S; 208/164; 252/417
[51] Int. Cl.² ........................................... B01J 8/26
[58] Field of Search .................... 23/288 S, 288 B; 208/164; 252/417, 419

[56] References Cited
UNITED STATES PATENTS

| | | | |
|---|---|---|---|
| 2,427,112 | 9/1947 | Tyson | 23/288 S |
| 2,541,662 | 2/1951 | Palmer | 23/288 S |
| 2,658,822 | 11/1953 | Hengstebeck | 23/288 S |
| 2,704,154 | 3/1955 | Huth | 252/417 X |
| 2,843,460 | 7/1958 | Borey et al. | 208/164 X |
| 2,857,240 | 10/1958 | Quincy | 252/417 X |
| 3,661,799 | 5/1972 | Cartmell | 208/164 X |
| 3,679,576 | 7/1972 | McDonald | 23/288 S X |
| 3,687,841 | 8/1972 | Saxton et al. | 23/288 S X |
| 3,732,081 | 5/1973 | Carson | 23/288 S |
| 3,806,324 | 4/1974 | Maclean et al. | 208/164 X |

*Primary Examiner*—Morris O. Wolk
*Assistant Examiner*—Roger F. Phillips
*Attorney, Agent, or Firm*—Marthe L. Gibbons

[57] ABSTRACT

Process and apparatus for hydrocarbon conversion, such as, fluid catalytic cracking, in which finely divided catalyst is circulated from a catalyst regeneration vessel through a standpipe connected by an angle bend to a vertically inclined conduit which in turn is connected to a straight vertical transferline riser reaction zone into a gas-solids disengaging and stripping vessel without the necessity of a variable orifice flow control valve. Separated spent and stripped catalyst flows from the disengaging-stripping vessel to the regeneration vessel through an external conduit.

8 Claims, 2 Drawing Figures

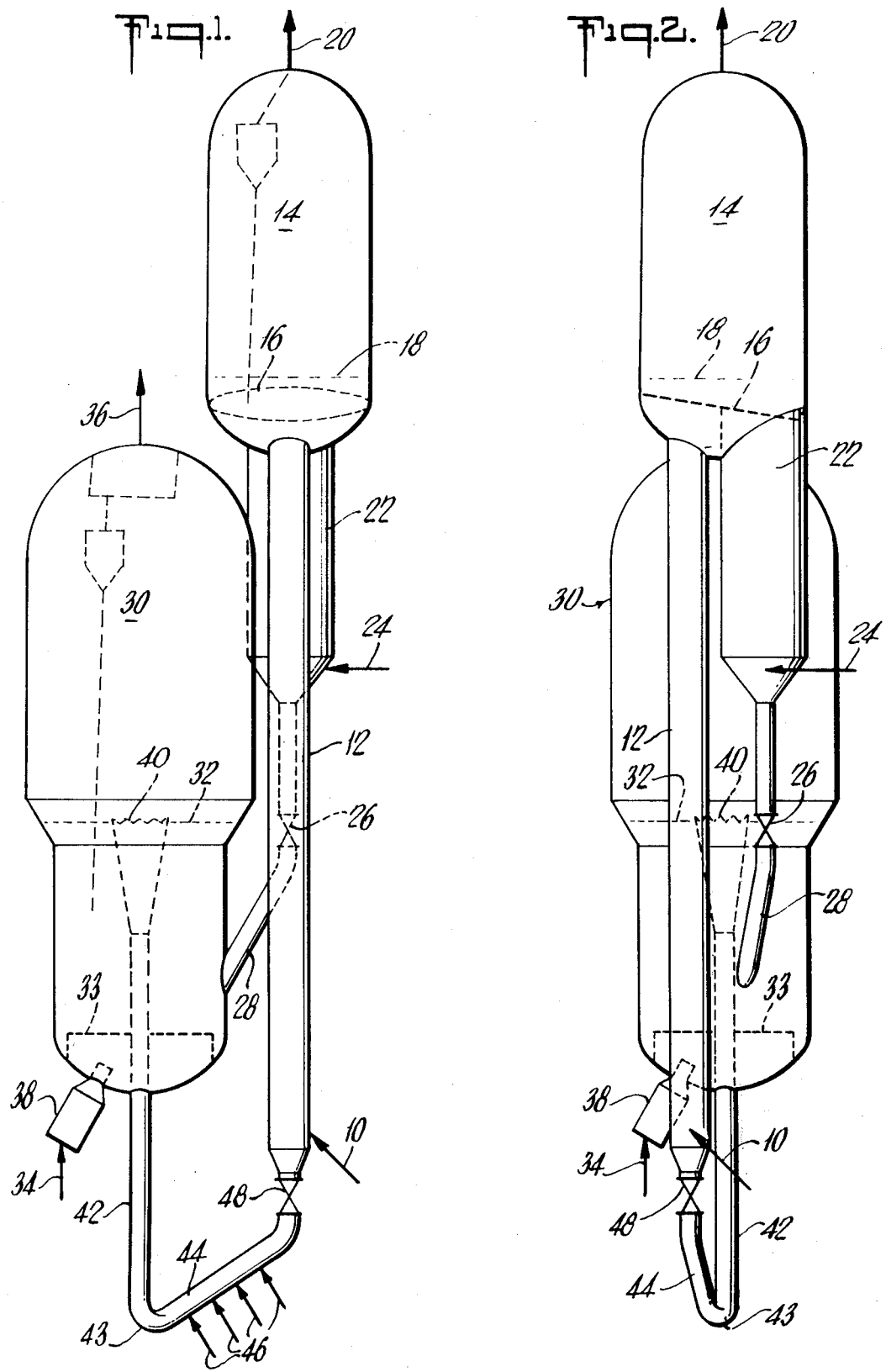

CATALYTIC HYDROCARBON CONVERSION APPARATUS

This is a division of application Ser. No. 451,804, filed Mar. 18, 1974, now U.S. Pat. No. 3,923,642.

BACKGROUND OF THE INVENTION

1. Field of the Invention

This invention relates to a process and apparatus wherein fluidized solids are used in the treatment and conversion of hydrocarbons. It is applicable to systems wherein such fluidized solids are continuously recycled between a reaction zone and a separate regeneration or reactivation zone, especially where the atmosphere in the reaction zone is different from that in the regeneration zone and no mixing of the atmospheres of the two zones can be allowed to take place.

2. Description of the Prior Art

Extensive commercial utilization of such fluidized systems has been made in the petroleum industry for the catalytic cracking of hydrocarbons. As shown in *Hydrocarbon Processing*, September 1972, pages 131 to 138, catalytic cracking processes are well known to those skilled in the art. For example, the cracking reactions may take place at a temperature in the range of about 800° to about 1100° F., preferably from about 900° to 1100° F. Pressures employed in such cracking processes may range from about atmospheric to about 50 pounds per square inch gauge (psig) with a preferred range of pressures from about 20 to about 35 psig.

It is known to circulate finely divided solids between a reaction vessel and a regeneration vessel without the use of slide valves as shown, for example, in Packie's U.S. Pat. No. 2,589,124 in which solids are circulated between two vessels into U-shaped tubes, each of which has a riser section into which a controlled amount of gas is injected to regulate the rate of flow of the solids. Utilization of the Packie type U-bend with control risers sets certain limits on the relative arrangement of the two vessels. It is not always economical to arrange the vessels such as would be required for an efficient U-bend system of conveyance of solids. Furthermore, in such systems, in which the regenerated catalyst withdrawal standpipe is eccentrically arranged in the regeneration vessel, expandable seals are required between the grid which supports the fluidized bed present in the regeneration vessel and the vessel wall to absorb the thermal expansion of the grid, or between the standpipe and grid. These seals are subject to failure which results in loss of catalyst and, eventually, in costly shut-down of equipment. This problem is particularly aggravated in high temperature regeneration procedures.

The conventional conduits for catalyst circulation from one vessel to another have been vertical standpipes, sloped standpipes, U-bends and sloped risers. Recent unit configurations in catalytic cracking have generally utilized either sloped standpipes and vertical risers or U-bends. The difficulty with both of these schemes, but particularly the U-bend, is that aeration air can be released in the sloping or horizontal section of the conduit and form a bubble which in turn interferes with catalyst flow. This condition does not generally occur with fine catalyst containing 10 percent of 0 to 40 micron size fines; however, the condition becomes troublesome when these fines drop to 2 to 3 percent, and the 80 plus micron size particles are greater than 30 to 35 percent.

It is also known to crack hydrocarbons in a vertical transferline reaction zone which extends straight into a cyclone-stripper vessel as shown in *Hydrocarbon Processing*, September 1972, page 133.

It has now been found that improved results can be obtained with a catalytic conversion process and apparatus having a specified combination of features.

Furthermore, it has been found that solids can be circulated between the two vessels in a conveyance system utilizing only a single variable orifice control valve and without the necessity for a control riser section to convey the solids to the regeneration vessel. Moreover, in the preferred embodiment of the apparatus of the invention, expandable grid seals can be omitted from the regeneration vessel and from the reaction vessel.

SUMMARY OF THE INVENTION

In accordance with the invention, there is provided, in a process for the catalytic conversion of hydrocarbons wherein a fluidized catalyst is circulated through a system comprising a catalyst regeneration vessel containing a fluidized bed of catalyst undergoing regeneration by passage of regeneration gas therethrough, an elongated hydrocarbon conversion zone, and a gas-solids separation vessel, the improvement which comprises: overflowing catalyst from the upper level of the bed in said regeneration vessel into an upper open end of a standpipe which extends into said regeneration vessel; passing the catalyst downwardly through said standpipe; continuing the passage of the catalyst around the bend base of said standpipe and upwardly through a vertically inclined conduit connected at one end to the bend base of said standpipe; intermixing additional transporting gas with the catalyst passing through the vertically inclined conduit; passing the catalyst upwardly through a straight vertical conduit connected to the other end of said vertically inclined conduit, said straight vertical conduit extending into and having an open end terminating in a gas-solids separation vessel; forming a suspension of catalyst in vaporized hydrocarbons in said straight vertical conduit; passing said suspension from the open end of said straight vertical conduit to said gas-solids separation vessel to effect conversion of at least a portion of said vaporized hydrocarbons; separating said catalyst from said vaporized hydrocarbons; passing said separated catalyst into an open end of a stripping zone positioned in the lower portion of said gas-solids separation vessel, said open end of the stripping zone being separated from said open end of the straight vertical conduit; stripping hydrocarbons from said catalyst in said stripping zone; passing at least a portion of said stripped catalyst from the bottom of said stripping zone to said regeneration vessel through a conduit connected at one end to said stripping zone and at the other end to said regeneration vessel, and controlling the flow of catalyst from said stripping zone to said regeneration vessel by a variable orifice means positioned therebetween.

In one embodiment of the invention, the standpipe which extends into the regeneration vessel is located at the centerline (i.e. axially) of the vessel. This arrangement permits the elimination of expandable bellows seals between the standpipe and the regenerator grid by welding the standpipe with the grid. The welded construction provides support for each component.

Thus, in the catalyst circulation control scheme of the present invention, only one slide valve is used to control circulation to and from the gas-solids separation vessel. It should be noted, however, that if desired, the standpipe which extends into the regeneration vessel may have a wide open line-size valve at its base. The catalyst circulation scheme of the present invention is thus different from prior art schemes in which two slide valves are required or wherein, as shown in Packie's U.S. Pat. No. 2,589,124, the density in the catalyst line flowing into the regenerator is varied to control circulation. The Packie scheme utilizes only one variable to control circulation both to and from the reactor. However, a separate blower or a higher pressure source of air is required so that this air stream can be injected into the catalyst line flowing into the regenerator. In the present invention, the combination of overflow well in the regenerator and slide valve in the spent catalyst stream will accomplish the same result. A slide valve cannot be used in the regenerated circuit to control the flow when the temperature of the regenerator bed is maintained at 1400° F. The slides and slide guides in the slide valve are normally hard surfaced for extended life. Hard surfacing properties are greatly diminished at 1400° F. Thus, the circulation control scheme of the present invention eliminates the need for a valve made of high temperature-resistant materials and the need for a higher pressure air stream. Furthermore, eliminating the valve in the regenerated circuit reduces the pressure which must be built up in the regenerated catalyst circuit for flow. A saving of about 5 psig is envisioned. This saving can be translated to a lower regenerator vessel elevation of about 25 feet resulting in a lower cost unit and one with less wasted pressure drop (energy) in the process.

BRIEF DESCRIPTION OF THE DRAWING

FIG. 1 is a simplified elevation front view of the apparatus forming a part of the present invention in which the process may be carried out.

FIG. 2 is an elevation side view of the apparatus of FIG. 1.

DESCRIPTION OF THE PREFERRED EMBODIMENT

The preferred embodiment will be described with reference to the accompanying drawing.

Referring to FIG. 1, a suitable hydrocarbon feed is injected via line 10 into transferline riser 12 which contains hot regenerated catalyst. Upon injection, the hydrocaron feed is vaporized by contact with the hot catalyst. The resulting suspension of vaporized hydrocarbon and catalyst flows upwardly through the straight vertically disposed transferline riser where at least a portion of the hydrocarbon feed is cracked to lower boiling products. The density of the catalyst in the suspension may range generally from about 0.7 to about 10 pounds per cubic foot, preferably, from about 1 to 4 pounds per cubic foot. The suspension passes through the transferline riser (reactor) at a velocity between about 8 and about 60 feet per second, preferably from about 15 to 35 feet per second. The catalyst hold-up in the transferline reactor, using conventional silica-alumina cracking catalyst of a size between 10 and 300 microns with an average particle diameter of about 60 microns may be between 1 and 12 tons for a 50,000 barrels per day unit. The pressure in the transferline riser may be between 10 and 40 psig, for example, about 35 psig. The cracking temperature in the transferline riser may be between 825° F. and 1200° F., with the temperature at the inlet being higher than at the outlet of the transferline riser. Suitable space velocity in the transferline riser may range from about 40 to about 200 weight of hydrocarbon feed per hour per weight part of catalyst, and the catalyst to oil weight ratio may be between 3 and 10. The length to diameter (L/D) of the transferline riser may be between 30 and 6. Desirably, the length to diameter ratio of the transferline riser is such as to provide 3 seconds of gas resistance when the gasiform suspension of catalyst flows through the transferline at an average velocity of about 30 feet per second. The contact time could be reduced from 1 to 2 seconds if an easily crackable feed, such as residuum, is processed. The transferline riser projects upwardly into the lower portion of a gas-solids separation vessel 14 and terminates beneath distributing grid 16. Vessel 14 is positioned at a spaced distance and adjacent to regeneration vessel 30. Desirably, at least a portion of it is also positioned at a higher level than the top of vessel 30. The riser enters into the bottom cone of vessel 14 directly under grid 16 which is welded directly to the vessel shell. Thus, there is no need for an expandable seal or joint between the internal wall of the vessel and the grid such as normally exists in a unit having a distributor grid.

The suspension passes into a dense bed of fluidized catalyst having a level indicated at 18 where further hydrocarbon conversion occurs. The cracked hydrocarbon vapors pass through the upper level of the dense fluidized bed into superimposed dilute phase and cyclone separators (not shown) disposed in the upper portion of vessel 14, to separate product vapors from entrained catalyst particles. The catalyst particles are returned to the dense bed via cyclone diplegs and the product vapors are removed via product outlet line 20. Desirably, the cyclone separator may be a two-stage cyclone system. When increased gasoline boiling range product is desired, the dense fluidized bed may be omitted in vessel 14 and the transferline may be extended into the vessel such that the main conversion of hydrocarbons may occur in the transferline. The transferline may terminate directly in one or more cyclones located near the top of the vessel. Additional cyclones may be used to separate the catalyst substantially completely. The lower portion of vessel 14 comprises a stripping zone 22 in which hydrocarbons which adhere to spent catalyst are removed by stripping with a stripping gas, such as steam introduced via line 24. Desirably, grid 16 is sloped to facilitate the flow of spent catalyst into stripping zone 22. The stripping zone is offset 180° from the transferline entrance into vessel 14. The pressure balance of the unit will allow the catalyst level in the stripping zone to be held either somewhat above grid 16 to provide a higher holdup operation or it can be held very low in the stripping zone so as to provide dilute phase stripping and no dense bed cracking. Spent stripped catalyst flows from the stripper via control valve 26 into conduit 28 which terminates in the lower portion of regeneration vessel 30. The spent catalyst forms a fluidized bed having a level indicated at 32 above supporting grid 33 in the regeneration vessel. An oxygen-containing gas (air) is introduced via line 34 into the regeneration vessel to fluidize the catalyst and to react with a carbonaceous deposit thereof. Flue gas formed by combustion of the carbonaceous deposit and entrained solids pass through a cyclone separator system (not shown) disposed in the regeneration vessel. Solids are returned via cyclone dipleg to the fluidized bed while flue gases are removed overhead via line 36. Suitable operating conditions for the regeneration vessel are: a temperature in the range of about 1100° to about 1400° F., a pressure in the range of about 10 to about 45 psig., a superficial velocity of the gases passing upwardly through the regeneration vessel selected to maintain catalyst particles as a dense turbulent fluidized bed having a density between about 9 and 30 pounds per cubic foot.

The regeneration vessel may be built with a smaller diameter bottom section and a large top section. The diameter of the lower section would then be set so as to establish a high velocity contacting zone with a velocity of about 3 to about 6 feet per second. Desirably, the high velocity contacting zone in the lower portion of the regeneration vessel may be operated at about 4 feet per second velocity of the air passing up through the bed. The high velocity contacting zone would then be operated at a temperature ranging from about 1200° F. to about 1400° F., preferably at about 1325° F. The top of the regeneration vessel may be an enlarged section so as to provide sufficient space for adequately housing two or more stages of high efficiency cyclones. An auxiliary burner 38 is attached to the bottom of the regeneration vessel for heating the unit on startup of the process. The catalyst level within the regeneration vessel is held constant by an overflow well 40 located on the center line of the regeneration vessel. The well is the open upper end of a down flow withdrawal standpipe 42 which extends into the regeneration vessel.

The placement of overflow well 40 and standpipe 42 at the centerline of the regeneration vessel permits the elimination of expandable bellows seals which are generally required at the penetration of the grid. Grid 33 is welded directly to standpipe 42 for support. Unless standpipe 42 is axially located, welding of the grid thereto would subject the standpipe to uneven lateral forces caused by thermal expansion of the grid. Standpipe 42 is connected at its lower end by means of angle bend 43 with a vertically inclined conduit 44, which in turn, connects with vertical transferline riser 12 which has a section projecting upwardly into vessel 14 as previously described. Aeration taps 46, in which a fluidizing gas, such as, steam may be injected, are provided along the vertically inclined conduit and riser 12. Desirably, the vertically inclined conduit is sloped at an angle of about 45°. The vertically inclined conduit is made long enough so that it will clear the vertical projection of the enlarged section of the regeneration vessel and permit transferline riser to be vertical. If desired, a shut-off valve 48 may be provided at the entrance of the vertically inclined conduit into riser 12 or, alternatively, it may be installed at the bottom of standpipe 42 for use in startup of the unit or in emergency. This shut-off valve will always be either wide open or closed tight since it is not required for actual regulation of catalyst circulation when the unit is in operation. The shut-off valve may be located essentially anywhere along the length of riser 12 or anywhere along the length of standpipe 42. Instead of a shut-off valve, a ceramic-lined restriction orifice may be used.

By using the above described type of flow scheme, a control slide valve is not required in the hot regenerated catalyst circuit.

Catalyst flows down into standpipe 42 and assumes a density equal to approximately the minimum fluidization density of the catalyst or to somewhat less than 80% of this density as controlled by aeration gas to the standpipe. Pressure is built up as the catalyst flows down the standpipe. The maximum pressure exists at the angle bend entrance to the vertically inclined conduit. If the regeneration vessel pressure is 40 psig, the pressure at this point is about 46 psig. At this point, the catalyst stream at approximately the same density makes the bend and, by hydrostatic force, flows upward to the lower pressure vessel 14. The pressure in vessel 14 will be about 33 psig so that there is a large pressure driving force in this circuit. Catalyst flows upward in the vertically inclined conduit at essentially this same density. Aeration is added at aeration taps 46 to compensate for loss of aeration gas which is migrating directly vertically in the inclined conduit. This gas will preserve the fluidity of the catalyst in the bottom portion of the line, since the catalyst would deaerate and slump in the line if aeration were not provided. The aeration gas flow will flow in the direction of lower pressure in the unit which will be cocurrent with the catalyst flow to vessel 14. Alternatively, a quantity of gas greater than required just for aeration or fluidity control can be added to lower the density in the vertically inclined part of conduit 44. This will lower the catalyst density and increase catalyst flow. However, the addition of this gas is undesirable since relatively large quantities would be required to accomplish any significant density reduction. This would mean a requirement of a large amount of steam which would undesirably increase the size of the downstream equipment.

The feed is introduced at the top of the angle bend at location 10. The pressure at this point will be about 40 psig for a unit with a 40 psig regeneration vessel. Since there is a 46 psig pressure at the bottom of the standpipe for this illustrative case, there is a 6 psig static pressure differential keeping feed from flowing in reverse to the regeneration vessel. This differential is provided by the vertical height of vertically inclined conduit 44.

The catalytic cracking process of the invention is designed to provide a minimum of catalyst hold-up. A specific example of the distribution of the catalyst in this system of the process and apparatus of the present invention for a unit which operates on 50,000 barrels of feed per day is as follows:

| | |
|---|---|
| Regenerator | 50 tons |
| Circulating lines | 5 tons |
| Riser reactor | 2 tons |
| Beneath grid | 2 tons |
| Cyclone vessel | 10 tons |
| Stripper (dilute phase) | 10 tons |
| Hidden inventory | 10 tons |
| Total catalyst inventory | 89 tons | or 90 to 110 tons with dense phase stripping. This hold-up is equal to approximately 2 tons per thousand barrels of feed.

What is claimed is:

1. In an apparatus for the catalytic conversion of hydrocarbons, which comprises a catalyst regeneration vessel adapted to contain a fluidized bed of finely divided catalyst, a transferline riser wherein hydrocarbons are at least partially converted, a gas-solids disengaging vessel, and means for circulating finely divided catalyst between said vessels, the improvement which comprises:

a sole standpipe having an upper section extending through the lower portion of a regeneration vessel and terminating in an enlarged open end, said enlarged open end being an axially located overflow well, said sole standpipe being connected at its lower end to an angle bend; a vertically inclined conduit connected at its lower end to the other end of said angle bend; means for introducing a transporting gas into said vertically inclined conduit; a straight vertical conduit connected at its lower end to the upper end of said vertically inclined conduit and having its upper end opening into in a gas-solids disengaging vessel; means for introducing hydocarbons into said vertically straight conduit; said gas-solids disengaging vessel comprising means for supporting a fluidized bed of catalyst in its lower portion, gas-solids separation means in its upper portion and outlet means for vaporous effluent, a stripping zone positioned at a bottom portion of said gas-solids disengaging vessel, said stripping zone being separated and at a spaced distance from said straight vertical conduit, means for introducing a stripping gas into said stripping zone, said stripping zone being connected at its lower end to one end of a conduit for conveying stripped catalyst, said stripped catalyst conduit having an other end connected to said regeneration vessel, and a variable orifice catalyst flow control means positioned between said stripping zone and said regeneration vessel, said variable orifice means being the sole variable orifice means in said catalyst circulation means.

2. The apparatus of claim 1 wherein the end of the conduit connected to said stripping zone is positioned at a higher level than the other end of the conduit which is connected to said regeneration vessel.

3. The apparatus of claim 1 wherein at least a portion of said disengaging vessel is in elevated position relative to the top of said regeneration vessel.

4. The apparatus of claim 1 wherein a grid is welded directly to said standpipe for support of the standpipe.

5. The apparatus of claim 1 wherein said catalyst flow control means is a variable orifice valve.

6. The apparatus of claim 5 wherein said variable orifice valve is positioned between said stripping zone and said stripped catalyst conduit.

7. The apparatus of claim 1, wherein said gas-solids disengaging vessel comprises a grid welded directly to the interior wall of said vessel.

8. The apparatus of claim 1, wherein said gas-solids disengaging vessel comprises at least one cyclone positioned in the upper portion of said vessel and wherein said transferline terminates directly in said cyclone.

* * * * *